Nov. 16, 1954 E. J. WAY 2,694,265
EDUCATIONAL TOY AND PUZZLE
Filed March 2, 1950
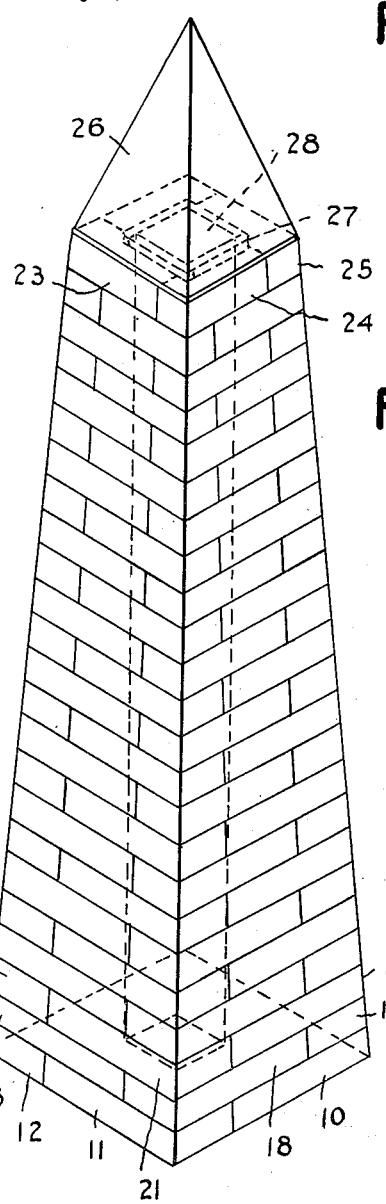
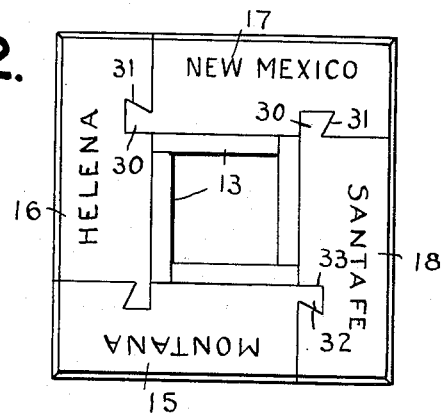
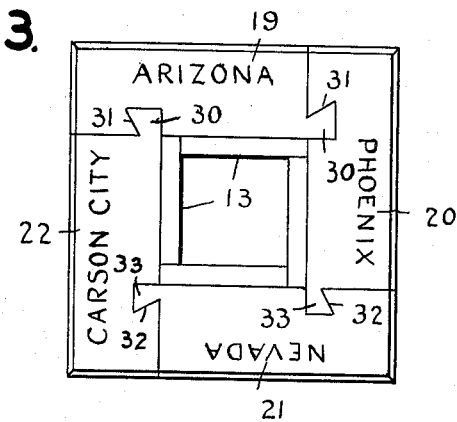
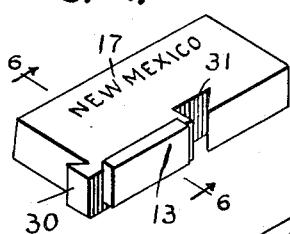
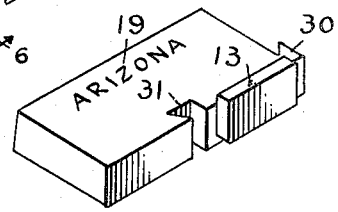
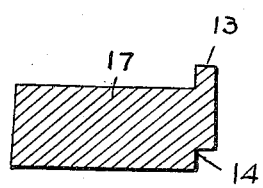
INVENTOR.
ELWOOD J. WAY
BY *Emery Holcombe & Blair*
ATTORNEYS.

2,694,265

Patented Nov. 16, 1954

UNITED STATES PATENT OFFICE 2,694,265

EDUCATIONAL TOY AND PUZZLE

Elwood J. Way, Washington, D. C.

Application March 2, 1950, Serial No. 147,167

4 Claims. (Cl. 35—40)

My invention relates to puzzles having an eductional purpose and comprises a number of toy building blocks so constructed as to form a tapering obelisk when properly assembled.

The invention aims to teach children and others to correlate certain episodes or facts of history or geography or other educational disciplines by associating them in pairs or groups of four in their proper relation to other pairs or groups of persons, places or circumstances, either fanciful or factual or even metaphysical, as may be desired.

The invention further aims to so construct the blocks as to make them self-selecting and interlocking in assembled position to form a stable structure of pleasing appearance, each block or pair of blocks preferably being different from all other blocks and having its own place in the structure.

An advantage of the invention lies in its applicability to multiple block puzzles as a key for aiding in the rapid assembling of the dissimilar blocks in proper relation which otherwise would be likely to require time consuming and vexatious matching of the individual blocks into their pairs and courses.

Further aims and advantages of the invention appear in connection with the following description of an illustrative puzzle containing ninety-six blocks, each block being different from every other block, arranged in pyramidal form in twenty-four courses of four blocks each, and respectively bearing the names of the States of the Union and their capital cities.

In the accompanying drawings Figure 1 is an isometric view of an obelisk capped with a pyramidal block, or pyramidion. Figures 2 and 3 are plan views of successive courses, Figure 2 showing a typical course composed of right hand blocks and Figure 3 showing a typical course composed of left hand blocks; Figure 4 is an isometric view of a right hand block; Figure 5 is a similar view of a left hand block; and Figure 6 is a cross section on the line 6—6 in Figure 4; Figures 2, 3, 4 and 5 being drawn to the same scale somewhat larger than Figure 1, and Figure 6 being considerably larger in scale.

The obelisk shown in the drawings is constructed in courses of four blocks each, the bottom or first course consisting of blocks 10, 11, 12 and a fourth block not shown, each having its longer side extending to the left from each outside corner, and on the left hand half of the inner long side each block is provided with a flange 13 which projects up to overlap the block above, which has a space or rabbet 14 to receive it. The second course of blocks 15, 16, 17, 18 have their longer sides extending to the right, the third course of blocks 19, 20, 21, 22 have their longer sides extending to the left, and so on to the top course, the longer sides of the blocks 23, 24, 25 therein extending to the right, as shown in Figure 1, thereby simulating courses of stone block masonry as commonly laid in which the vertical joints in successive courses are staggered. A four sided pyramid 26 tops the structure which is provided with a recess 27 in the upper course of blocks and forms a cover for the central well 28.

Figures 2 and 3 illustrate the second and third courses composed of right hand blocks and left hand blocks, respectively, the four blocks in the second course being marked Montana, Helena, New Mexico and Santa Fe, and the four blocks in the right hand course being marked Arizona, Phoenix, Nevada and Carson City. The larger blocks bear the names of the larger States and their capitals, and the smaller blocks bear the names of the smaller States and their capitals, from Texas and California in the bottom course to Delaware and Rhode Island in the top course. Thus a knowledge of the names and relative sizes of the States, and the names of their capital cities, is of great assistance in assembling the blocks in their proper order in the successive courses from the bottom to the top of the structure.

In order to position and lock together the blocks in each course and also to distinguish them from each other and from the blocks above and below of nearly the same size, the blocks in the respective courses are provided with dove-tail shape tongues on their inner ends and grooves in their inner sides of corresponding but different widths which are concealed in the assembled structure. These companion tongues and grooves form sets each of which varies from every other set in the same course with respect to the relationship of its members. For example, referring to Figure 2, block 17 has a wide tongue 30 and a wide groove 31, block 18 has a wide tongue 30 and a narrow groove 32, block 15 has a narrow tongue 33 and a narrow groove 32, and block 16 has a narrow tongue 33 and a wide groove 31, all being right hand blocks, while the left hand blocks 19, 20, 21 and 22 in the tier above as shown in Figure 3 (and likewise in the tier below) have wide and narrow tongues and grooves, respectively conforming to the same general pattern but arranged in the reverse order around the central well 28. Preferably the outer sides and ends of the blocks are painted to represent stone.

Inspection of Figures 2 and 3 discloses a correlation between the names of the States and cities and the widths of the tongues and grooves of the respective blocks, all of the blocks bearing the names of States either having wide tongues and wide grooves or narrow tongues and narrow grooves, while all of the blocks bearing the names of cities have a wide tongue and a narrow groove or a narrow tongue and a wide groove. Thus it is impossible to assemble two blocks of the same size having the names of States in the same course with the blocks of the same size having the names of cities except in the order (reading clockwise) of a State and its capital city.

Obviously various groups or pairs of related facts or matters may be assembled and applied to the blocks of successive courses in accordance with a logical or arbitrary pattern or arrangement which serves as a self-contained key for assembling the various blocks in their proper places in the obelisk, and the invention is not restricted to the subject matter or to the pattern of the illustrative example.

What I claim as my invention and desire to secure by Letters Patent is as follows:

1. An educational puzzle in the form of a pyramidal obelisk composed of a plurality of courses of matching blocks, the blocks of each course being of the same size and tapering from bottom to top on their outer faces, the inner faces of the blocks in each course having interengaging sets of tongues and grooves of complementary shape, said sets differing in form from each other on the respective mating blocks whereby no two blocks in the same course are alike, said sets of mating tongues and grooves in successive courses extending in opposite directions with respect to those in the courses above and below, and the blocks in each course being grouped in a plurality of series of at least two blocks in each series one of which bears the name of a geographical area and the other of which bears a name commonly associated with said area the names of larger areas appearing on the blocks of the lower courses whereby said blocks and courses are identified.

2. A combined educational puzzle and toy building block construction comprising substantially rectangular blocks having shorter ends than sides adapted to be arranged in courses to form the sides and corners of an obelisk-like structure each block of which bears part of a selected series of correlated indicia indicating its place in the structure, at least some of said blocks being arranged in pairs of which one block has one end exposed and forms a corner block in said structure, the blocks in each pair having correspondingly shaped tongue and groove portions on their engaging faces forming a set of interengaging positioning means, the positioning means on the side and end faces of the corner blocks matching exclusively the positioning means on the contiguous faces of the proper adjoining blocks in the same course to conform to said selected series, the blocks in successive courses being graduated in size and the corner blocks in the same course being alike except for their positioning means, each set of which varies in the relationship of said tongues and grooves, whereby said blocks in each successive course can only be assembled in a fixed order corresponding to the arrangement of the indicia in said selected series.

3. A combined educational puzzle and toy building block construction as set forth in claim 2 wherein the corner blocks in successive courses are stacked with their longer sides alternately to the right and to the left and arranged so that the tongues which project from the ends of the blocks in each horizontal course extend in the opposite direction around said vertical axis with respect to that of the tongues formed on the blocks in the courses immediately above and below, whereby the successive courses break joints vertically simulating masonry.

4. An educational puzzle and toy building block construction as set forth in claim 3 wherein the blocks in successive courses are of smaller size so as to stack in pyramidal form and wherein at least some of the blocks in each course are provided with flanges and recesses on their upper and lower faces respectively engaging with like recesses and flanges on blocks in the contiguous courses above and below, whereby superimposed blocks in successive courses are mutually interengaged to restrict lateral movement of one with respect to the other.

References Cited in the file of this patent

UNITED STATES PATENTS

| Number | Name | Date |
|---|---|---|
| 86,796 | Absterdam | Feb. 9, 1869 |
| 121,936 | Fisher | Dec. 19, 1871 |
| 1,071,358 | Matthews | Aug. 26, 1913 |
| 1,109,348 | McNerney | Sept. 1, 1914 |
| 1,902,136 | Mills | Mar. 21, 1933 |
| 2,395,129 | Lewis | Feb. 19, 1946 |

FOREIGN PATENTS

| Number | Country | Date |
|---|---|---|
| 116,700 | Germany | Jan. 14, 1901 |
| 214,098 | Great Britain | Apr. 17, 1924 |